Oct. 9, 1962
F. A. LAYNE
3,057,035
CERAMIC WARE SETTER
Filed Feb. 13, 1961
3 Sheets-Sheet 2
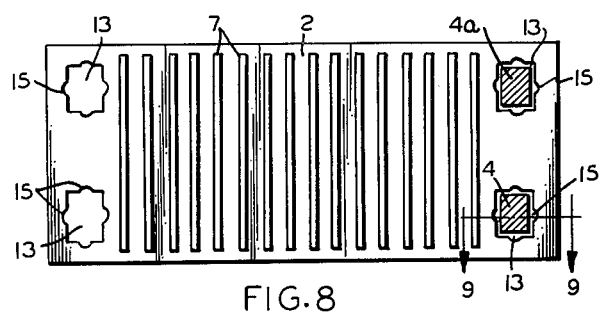
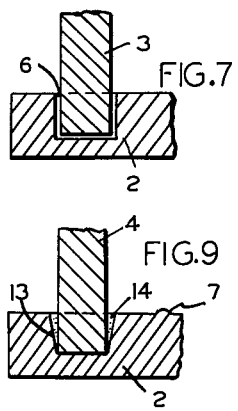
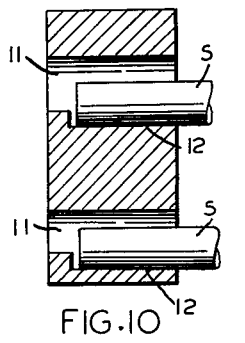
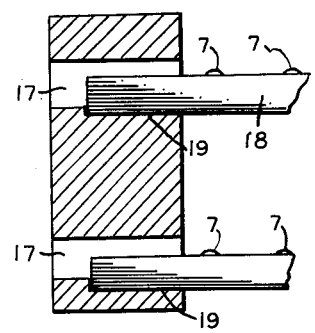
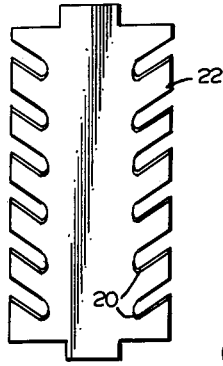
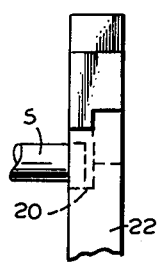
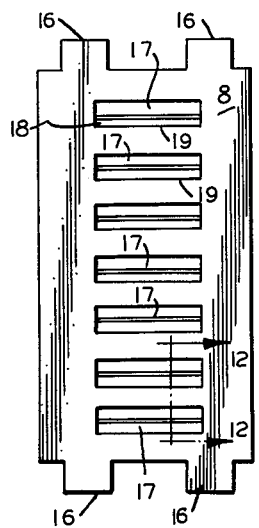
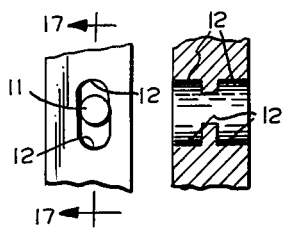
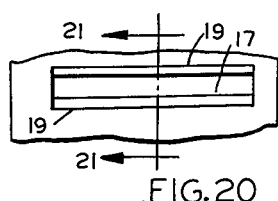
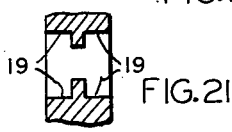
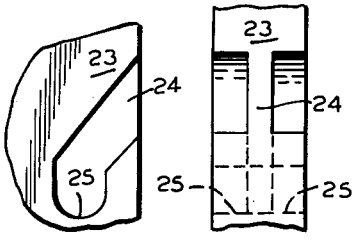
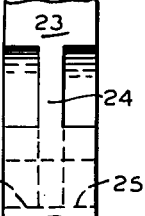
INVENTOR.
Fred A. Layne
BY
*Milton L. Simmons*
ATTORNEY United States Patent Office 3,057,035
Patented Oct. 9, 1962

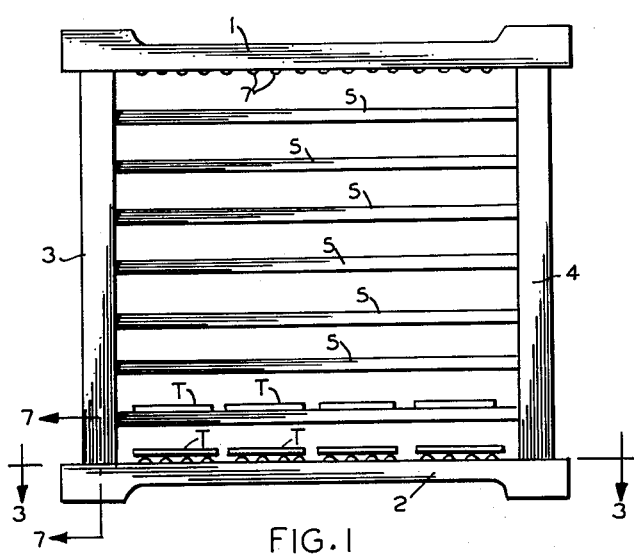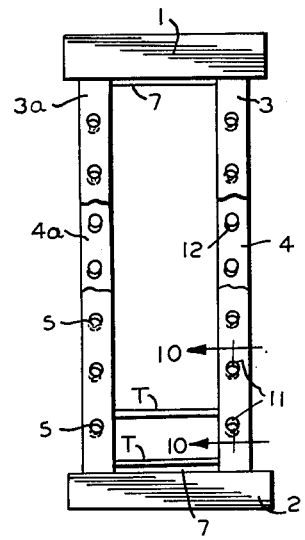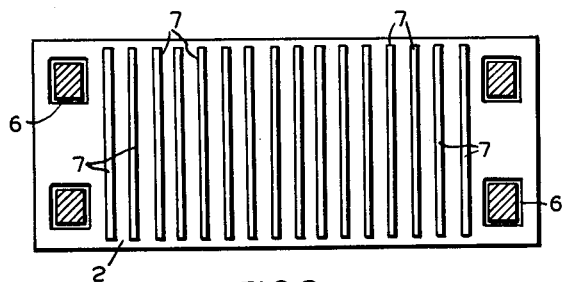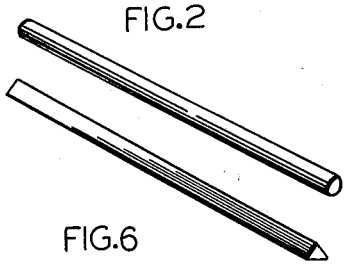
INVENTOR.
Fred A. Layne

3,057,035
CERAMIC WARE SETTER
Fred A. Layne, Calcutta, Ohio
Filed Feb. 13, 1961, Ser. No. 89,005
4 Claims. (Cl. 25—153)

This invention relates as indicated to ceramic ware setters and has more particular reference to improved means to expose tile to the heat of a kiln during a firing operation.

An object of this invention is to provide a knock-down ceramic ware setter all parts of which are interchangeable, thus permitting replacement of any part of the setter that might become unserviceable through breakage or use.

Another object of this invention is to provide a separable device of this character which has the rigidity and ease of handling of a one-piece ceramic ware setter.

A further object is to provide a ceramic ware setter with easily replaceable horizontal support members.

Yet another object of this invention is to provide a ceramic ware setter having a plurality of interchangeable horizontal, ceramic ware supporting members, any one, or all of which can be quickly and easily removed and replaced without dismantling the main framework of the tile setter.

Another object is to provide a ceramic ware setter having readily replaceable tile supporting members which are not easily displaced through vibration and handling.

Other objectives will appear as the description proceeds.

Any number of tile setters have been developed which comprise generally a top and bottom member, with vertical side walls connecting to the top and bottom members to form a semi-rigid, box-like, framework with two opposite open sides, with means for supporting horizontal ceramic ware supporting members disposed between said top and bottom members, and supported at each end by said side members, which horizontal members in turn support tile or other ceramic ware pieces which are to be fired in a suitable kiln.

For example, United States Patent No. 2,897,571 to Kupchinsky et al., describes a tile setter of this general description, having interchangeable ends, and top and bottom members as well as horizontal tile-supporting plates. However, this setter has a disadvantage in that in order to replace one of the horizontal tile-supporting members, the entire setter must be dismantled.

In United States Patent No. 866,960 to Pratt, there is described a sagger into which could be slidably introduced bars or rods through a suitable aperture in one upright end of the tile setter, said bar spanning the open interior of the sagger and being received in a supporting recess in the opposite wall of said sagger. However, Pratt's sagger did not contain interchangeable side walls and top and bottom, and furthermore, the tile supporting bars of Pratt would tend to fall or slide from their position in the sagger through vibration and tilting.

I have found however, that by the use of a novel countersunk recess in an interchangeable side wall, tile-supporting bars or rods can be firmly locked in place in a knock-down setter, but at the same time are quickly and easily removable from said setter without the need for dismantling same as will be described in more detail hereinafter.

In the attached drawings: FIG. 1 represents a front view of one embodiment of the invention, assembled;

FIG. 2 is a detailed front view of a bottom member of a setter of this invention;

FIG. 3 is a plan view of the bottom member of the setter of this invention;

FIG. 4 is a longitudinal cut-way view of four assembled side walls of this invention, the portion visible through the cutaway representing the side walls at the far end;

FIG. 5 is a longitudinal view of a slightly modified side wall;

FIG. 6 is a perspective view of two types of setter rods which may be used in this invention;

FIG. 7 is a cross section on the line 7—7 of FIG. 1;

FIG. 8 shows a modification of the bottom member shown in FIG. 3;

FIG. 9 is a cross section taken on the line 9—9 of FIG. 8;

FIG. 10 is an enlarged view of the cross section taken along line 10—10 shown in FIG. 4;

FIG. 11 is a longitudinal view of a slightly modified side wall viewed from the interior of the setter, and adapted to utilize plates, shown in place, rather than rods;

FIG. 12 is a cross section on the line 12—12 of FIG. 11;

FIG. 14 is a longitudinal view of another modified side wall, viewed from the interior of the tile setter;

FIG. 15 is a side view, along the edge, of one of the notches in the side walls depicted in FIG. 14, showing a circular rod in place;

FIG. 16 shows another variation of the opening in the side walls as shown in FIG. 4;

FIG. 17 is a cross section along the line 17—17 in FIG. 16;

FIG. 18 shows yet another variation of the notched recesses in FIG. 14;

FIG. 19 is a side view, along the side wall's edge, of the two-sided notch illustrated in FIG. 18;

FIG. 20 shows another variation of the rectangular opening and countersunk surfaces as depicted in FIG. 11;

FIG. 21 is a cross section along the line 21—21 of FIG. 20.

Figure 13:
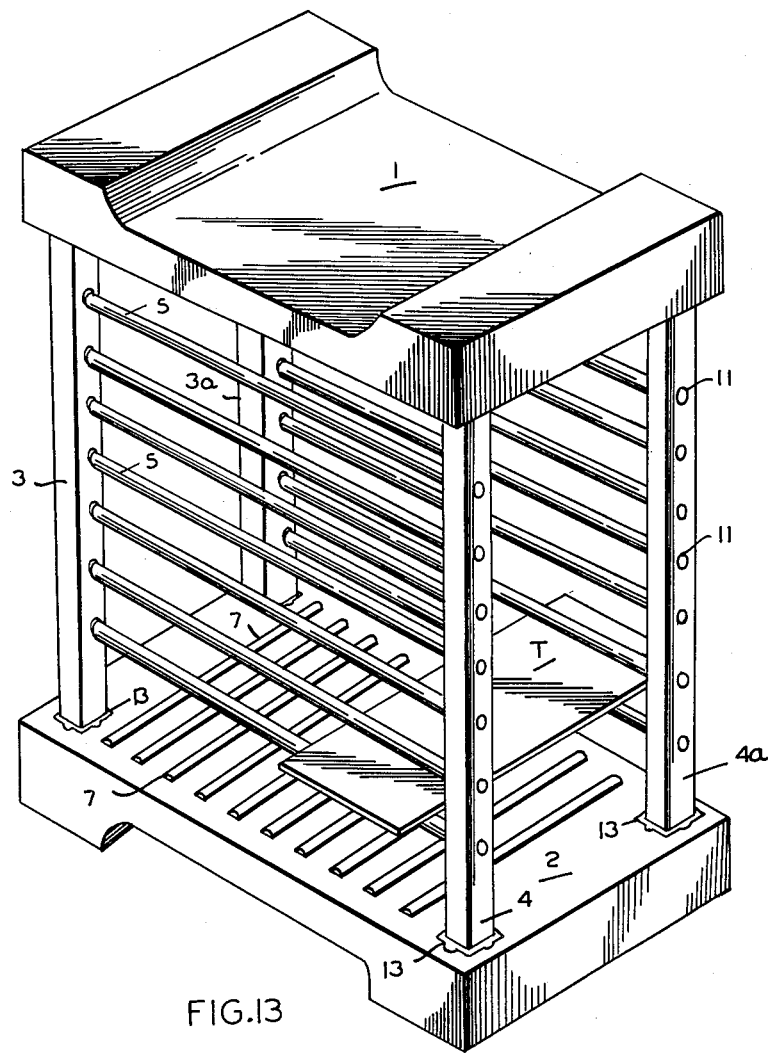
FIG. 13 is a perspective view of the tile setter depicted in FIG. 1.

Referring more specifically to the drawings, a tile setter constructed according to the present invention embodies a top member 1, a bottom member 2, side walls 3, 3a and 4, 4a and a plurality of ceramic ware supporting rods 5.

Top and bottom members 1 and 2 are provided with a plurality of sockets 6 and side members 3, 3a and 4, 4a are adapted to fit into sockets 6. The fit between sockets 6 and side walls 3, 3a and 4, 4a is substantially snug. It is entirely within the contemplation of the present invention to provide top and bottom members 1 and 2 and side walls 3, 3a and 4, 4a with different arrangements of socket connection. As for example, in FIG. 5 is shown a single side wall 9 with tenons 10 which tenons would fit into a corresponding arrangement of sockets. In addition to the possible modification of tenons where single side walls are employed, it is also contemplated to modify the sockets of the top and bottom members. Specifically referring to FIGS. 8 and 9 there will be seen sockets 13 which are substantially larger than necessary to accept the introduction of the ends of side walls 3, 3a and 4, 4a. With the construction of this character the side wall ends are inserted into sockets 13 and then fine dry sand 14 is allowed to sift into the space between the ends of the side walls and the wall of the socket 13. This wedges in the side walls in the sockets and holds them firmly in place. The arcuate shaped extensions 15 are an aid in sifting the sand into the socket.

When the setters are assembled the end of side walls 3, 3a and 4, 4a are inserted into sockets 6 or 13, depending upon the socket arrangement selected. It will be observed that side walls 3, 3a and 4, 4a are provided with a plurality of substantially equally spaced openings 11 which are in opposed parallel relation. After the side walls have been inserted in their respective sockets, top member 1 is placed in position and a rigid setter is thus completed.

Referring to FIGS. 4 and 10, it can be seen that the openings 11 extend completely through the side walls, and are large enough to permit passage therethrough of a rod 5 and are partially countersunk from the interior face to provide a depressed bearing surface 12 which carries the rod 5, and which prevents rod 5 from moving laterally since the bottom surface of said countersink is lower than the lowermost point of the opening 11.

Thus, in practice, the rods 5 are not sufficiently long to traverse the gap existing between the inner edges of the lowermost point of the countersunk openings 11. Therefore, in a partially assembled setter wherein the four vertical side members 3, 3a and 4, 4a have been fitted as described above into top and bottom members 1 and 2, forming a box-like structure with two open sides, and with the countersunk (inner) faces of the vertical side walls facing inwardly, the rods 5 are slid through an opening 11, from the outer face, along a horizontal line, toward the interior of said setter, and dropped into position resting on the lower surfaces 12 of the countersinks, since, as described above, the rod 5 is not long enough to span the gap existing between the inner edges of the lowermost point of the horizontally opposed openings 11.

As used herein, the term "countersunk recess" refers to an enlargement of the opening 11 for only a fraction of its total depth, and at least as wide, in the generally horizontal dimension, as opening 11, in the inner face of the vertical side walls, to provide a horizontal tile-supporting member bearing surface, which is lower, when the side wall is in operating position, than the lowermost point of opening 11. The difference between the levels of the bottom of opening 11 and bearing surface 12 providing the means for preventing lateral displacement of the ceramic ware supporting members in the form of rods 5 through vibration and ordinary handling. The lower portion of the countersink conforms generally to the lower portion of opening 11, in outline, viewed from the interior of the setter.

Thus it can be readily seen that any number, or all, of the rods 5, may be quickly and easily elevated from contact with the lower, ceramic ware supporting member bearing surface 12 of the countersink, and slid through its respective opening 11 at either end of the tile setter, and a replacement rod inserted quickly and easily as described above, without the need for dismantling the tile setter completely.

While we prefer rods of circular cross section for ease of rotation if they should become warped by heat, it is contemplated that a rod of square, hexagonal, trapezoidal, triangular, etc., cross section could be utilized just a readily. Also, my invention would apply to horizontal relatively flat plate members instead of rods, the principle of my invention residing in a box-like tile setter with generally parallel top and bottom members, generally vertical side walls connecting said top and bottom members, and having generally horizontal tile supporting members which may be introduced or removed from the tile setter through horizontally opposed openings in either side wall, such openings being of a shape and size to permit the passage therethrough of said horizontal tile-supporting member regardless of whether it is a plate or rod, said opening communicating with a partial countersink in the inner face of said side walls thus providing a horizontal ceramic ware supporting member bearing surface lower than the lowermost point of said opening, whereby the horizontal ceramic ware supporting member, when resting on the bearing surface of said countersink, is prevented from being displaced laterally through the openings 11, unless it is elevated free of said bearing surface to a point level with the lowermost point of the bottom surface of the countersunk opening 11, and then passed through either of its respective openings in either of said side walls.

FIGURE 11 shows a modified form of a side wall which could replace either pair of end side walls 3, 3a or 4, 4a, with tenons 16 fitting into either sockets 6 or 13 in top and bottom plates 1 or 2. It will be noted that the openings 17 have been adapted for the passage therethrough of a flat rectangular plate 18 rather than a bar. Similar to the rod 5, the plate 18 fits into a rectangular countersunk recess as shown in FIG. 12, and is thus prevented from becoming loose and passing through the opening 17 either through vibration or tilting by reason of bearing surface 19 being lower than the lowermost point of opening 17. As in the case of rods, the plates are simply lifted high enough to clear the notch formed by the countersink and slid through the opening 17 and out of the setter. While I show the surface connecting bearing surface 12 and 19 with the lowermost points of openings 11 or 17 respectively, to be a vertical step, this could obviously be a concave curve, or inclined plane.

The setter plates 18, as well as the setter tops and bottoms 1 and 2 are provided with up-raised ribs 7 which are substantially parallel and equally spaced. Thus the bottom of tile T will only have a minimum of contact area when in contact with a bottom member during the firing operation, or when in contact with one of the horizontal tile-supporting plates 18. When rods such as those depicted in FIG. 6 are used in conjunction with end walls such as 9 shown in FIG. 5, or the combination of end walls 3, 3a and 4, 4a, the design of the bars is such that they present a minimum area of contact to the bottom of the tile which they support, as shown in the perspective view of FIG. 13.

Due to the interchangeable features of this setter, it is a simple matter to replace any one or more parts with another, without having to replace the entire setter. Aside from the economy of material realized, it will be readily seen from the description that the speed with which horizontal tile-support members can be replaced represents a considerable saving in time and labor in making quick repairs to tile setters "on the line."

The parts of this device are preferably composed of a refractory material which is fired in an appropriate kiln and which is capable of withstanding the high heat employed in kilns for firing of tiles.

FIGS. 14 and 15 and FIGS. 18 and 19 depict another version of the invention as applied to side walls having inclined notches along their edges. FIG. 14 shows inclined notches along vertical edges of side wall member 22 with countersunk recesses as bearing surfaces 20, adjacent the vertical edge of side wall 22. FIG. 15 shows a circular rod 5 in place, carried by bearing surface 20.

FIGS. 18 and 19 show the use of a partitioned variation of the countersunk recess shown in FIG. 14, for use as a centrally disposed wall in a ceramic ware setter of exceptional length requiring three (3) vertical walls, with one in the center. Thus, wall 23, with its partitioned notches having partition 24, and bearing surfaces 25, could be interchangeably used at either end of such a setter, or in the center; a centrally placed wall 23 then receiving into both sides, ceramic ware supporting members carried by bearing surfaces 25.

In the recesses depicted in FIGS. 14 and 18, the ceramic ware supporting member, (rod 5) is introduced into the recess via the inclined passage shown.

FIGS. 16 and 17, and 20 and 21, respectively, show variation of the opening and countersink combination of FIGS. 4 and 10, and, 11 and 12, whereby the openings have been countersunk from both faces of the side wall, and above and below the opening, to further enlarge upon the versatile, interchangeable feature of the invention.

In summary, the present invention has provided:

(1) A ceramic ware setter wherein the horizontal ceramic ware supporting members are interchangeable and quickly and easily removable without dismantling the setter framework, but which can be locked into place and will not fall out when the setter is tilted, or vibrated.

(2) A setter as described in (1) above wherein top and bottom members, and side member, are interchangeable respectively.

(3) A setter as described in (2) above which is a rigid handling unit.

I, therefore, particularly point out and distinctly claim as my invention:

1. In a reversible knock-down ceramic ware setter comprising interchangeable generally horizontal top and bottom members, interchangeable generally vertical side walls alike in construction, and interchangeable horizontal ceramic ware supporting members disposed in spaced vertical relationship generally normal to said side walls and supported therebetween, each of said top and bottom members being provided with sockets spaced adjacent the ends thereof, said side walls adapted to be inserted in said sockets, said side walls being received in said sockets in generally snug relationship, said side walls being in generally stable relation with said top and bottom members when assembled therewith and extending in generally vertical planes, each of said side walls being provided with a plurality of substantially equally spaced openings extending completely through said side wall, said openings arranged in opposed and parallel relation with respect to their counterpart opening in the opposite side wall, the improvement consisting essentially of each said opening being of a size and shape to permit the passage therethrough of said horizontal ceramic ware supporting member, each of said openings communicating with a countersunk recess in the interior face of said side wall, said countersunk recess extending below, conforming generally to the lower contour of, and having a width, measured in the plane of said side wall, at least equal to that of, said opening, said countersunk recess having a generally horizontal dimension generally parallel to the longitudinal axis of said top and bottom members to provide a ceramic ware supporting member bearing surface, for its respective horizontal ceramic ware supporting member adapted to pass through said opening, and to seat in and be carried by said bearing surface of said countersunk recesses of two generally opposed side wall openings.

2. The reversible knock-down ceramic ware setter of claim 1 having countersunk recesses above and below each of said openings in each face of said side walls.

3. In a ceramic ware setter having generally horizontal top and bottom members, said top and bottom members firmly held in spaced parallel relationship by connecting, opposed, generally vertical side walls having inner and outer faces, with horizontal ceramic ware supporting members disposed in spaced vertical relationship generally normal to said side walls and carried therebetween, each of said side walls being provided with a plurality of substantially equally spaced openings extending completely through said side walls, said openings arranged in opposed and parallel relation with respect to their counterpart openings in the opposite side wall, the improvement consisting essentially of the combination of a countersunk recess communicating with each of said openings in the inner face of said side walls, said countersunk recess extending below, and conforming generally to the bottom contour of, said opening to provide a bearing surface for said horizontal ceramic ware supporting members, and a plurality of horizontal ceramic ware supporting members, said horizontal ceramic ware supporting members being of a length less than the horizontal dimension between the outer faces of said generally vertical side walls, said ceramic ware supporting members adapted to be introduced into said setter generally horizontally through said openings and seat in and be carried by said bearing surfaces of said countersunk recesses of two generally opposed side wall openings.

4. In a ceramic ware setter having generally horizontal top and bottom members, said top and bottom members firmly held in spaced relationship by connecting, generally vertical side walls having inner and outer faces, with horizontal ceramic ware supporting members disposed in spaced vertical relationship generally normal to said side walls and carried thereby and therebetween, each of said horizontal ceramic ware supporting members having a length less than the horizontal dimension between the outside faces of said two opposed side walls, the combination therewith of a plurality of substantially equally spaced recesses in the inner face of said side walls, adjacent a vertical edge of said side walls, said recesses extending less than completely through said side walls, said recesses arranged in opposed and parallel relation with respect to their counterpart recesses in an opposed side wall, each of said recesses having a generally horizontal dimension, generally parallel to the longitudinal axis of said top and bottom members, to provide a horizontal ceramic ware supporting member bearing surface, an individual passage communicating respectively with each recess from an edge of said vertical side wall, and a plurality of horizontal ceramic ware supporting members, each respectively adapted to be introduced into supported contact, at each end of said horizontal ceramic ware supporting member, into two generally opposed aforementioned recesses via their respective individual passages, each said horizontal ceramic ware supporting member having a horizontal dimension, parallel to the inner face of said generally vertical side walls, less than half the horizontal dimension of said generally vertical side walls, measured across their inner faces, each said horizontal ware supporting member adapted to be removed from supported contact within said setter, and reinserted therein in a position of rotation of 90° about its longitudinal axis, the ends of said horizontal ceramic ware supporting members, when viewed along the longitudinal axis of said members, being represented by a substantially planular surface.

References Cited in the file of this patent

UNITED STATES PATENTS

| | | |
|---|---|---|
| 866,960 | Pratt | Sept. 24, 1907 |
| 941,044 | Rivers | Nov. 23, 1909 |
| 1,885,691 | Dressler | Nov. 1, 1932 |
| 2,027,585 | Geiger | Jan. 14, 1936 |
| 2,602,984 | Owen | July 15, 1952 |
| 2,897,571 | Kupchinsky et al. | Aug. 4, 1959 |